UNITED STATES PATENT OFFICE.

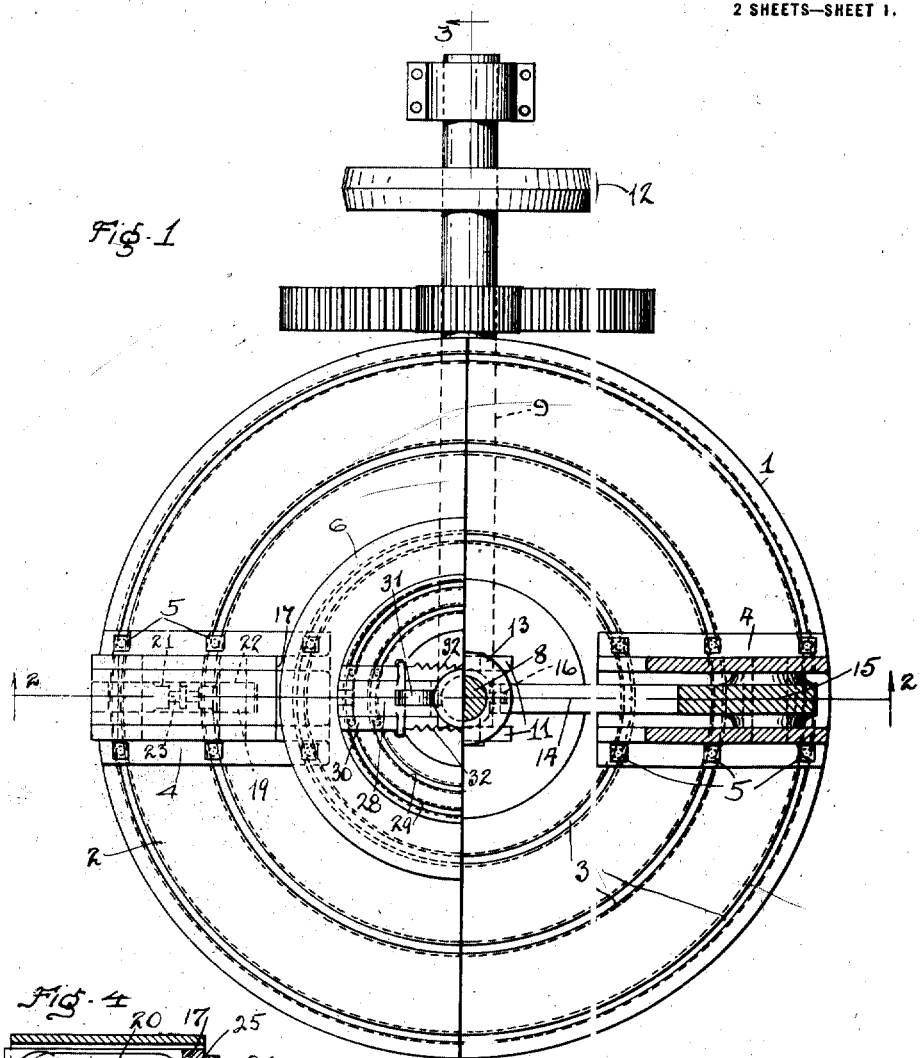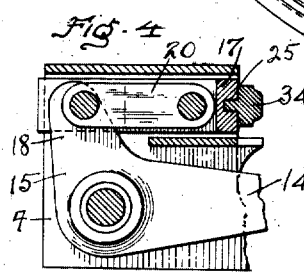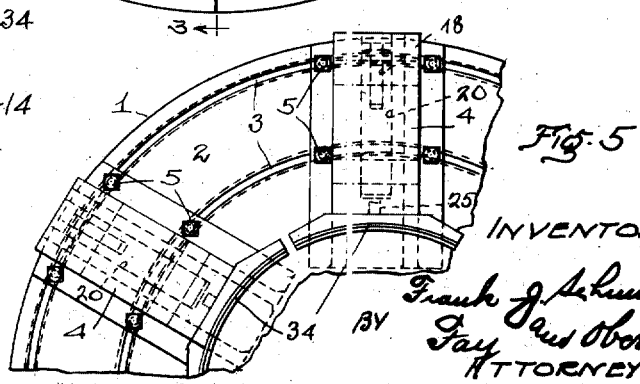

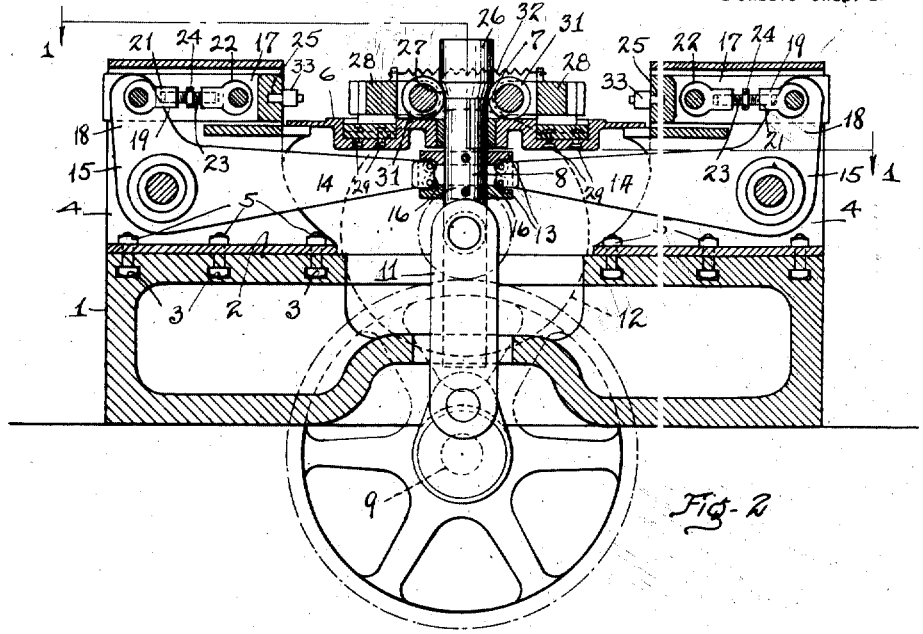
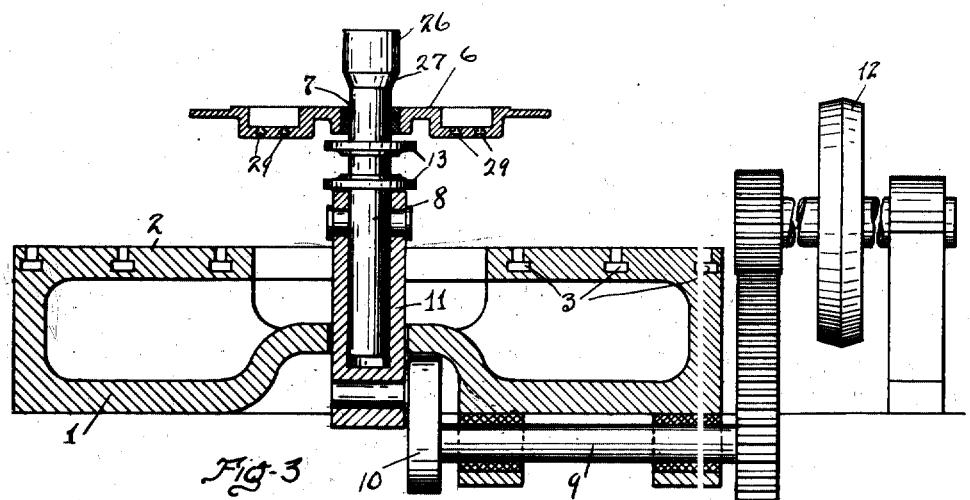

FRANK J. SCHUMANN, OF CLEVELAND, OHIO, ASSIGNOR TO THE STANDARD WELDING COMPANY, OF CLEVELAND, OHIO, A CORPORATION OF OHIO.

MACHINE FOR PUNCHING AND SETTING TIRES.

1,219,170.  Specification of Letters Patent.  Patented Mar. 13, 1917.

Application filed December 14, 1914. Serial No. 877,130

*To all whom it may concern:*

Be it known that I, FRANK J. SCHUMANN, a citizen of the United States, and a resident of Cleveland, county of Cuyahoga, and State of Ohio, have invented a new and useful Improvement in Machines for Punching and Setting Tires, of which the following is a specification, the principle of the invention being herein explained and the best mode in which I have contemplated applying that principle, so as to distinguish it from other inventions.

In the manufacture of ordinary metal tires for vehicle wheels there is usually occasion to punch a number of holes through the tire at spaced intervals to receive the securing bolts, and it is also necessary more or less to size the tire to fit a prescribed diameter of wheel; and in the manufacture of tire supporting rims, whether permanent or demountable, such as are used in large numbers on automobiles, occasion for similar operations arises, the holes being punched not necessarily for use with securing means, but for the valve stem to pass through and for the attachment of accessory parts, and even where the latter are welded on to the rim, it may be necessary to punch up lugs or spots for use in such welding operation. It is also more essential in the case of such automobile rims, particularly of the demountable type, that they conform exactly to prescribed diametral and circumferential dimensions, so that it is necessary to size, or set, such rims.

The object of the present invention, accordingly, is to provide a machine whereby operations such as the foregoing, consisting either of punching holes or apertures in a tire or rim, or indenting or otherwise deforming portions of said rim, or sizing the same, may be accomplished expeditiously and yet with exactitude. The present improved machine is particularly adapted to meet the requirements of a large production, materially decreasing the cost of manufacture. To the accomplishment of the foregoing and related ends, the invention then consists of means hereinafter described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Figure 1 is a plan view, with a portion in horizontal section, of a machine embodying the present improvements; Fig. 2 is a central vertical section of such machine taken on the line 2—2, Fig. 1; Fig. 3 is a central vertical section of a portion of the machine taken on a plane at right angles to that of Fig. 2, as indicated by the line 3—3, Fig. 1; Fig. 4 is a vertical section of a detail taken on a plane corresponding to that of Fig. 2, but showing a modification in construction; and Fig. 5 is a plan view of such modified detail.

The base 1 of the machine, as illustrated in the foregoing figures of the drawings, is preferably of general circular form, having an annular top 2 in which are provided a plurality of concentric under-cut grooves or T-slots 3, three in number as shown, which constitute ways by means of which housings 4 of box-like form may be secured to said base in any desired angular position with respect to the central vertical axis of the machine. Bolts 5, having their heads held in such under-cut grooves or ways, serve to thus secure such housings, when in properly adjusted position as aforesaid.

Supported by said housings 4, or other equivalent bracket members rising from the top of the base, is a central circular plate 6, on which may be mounted additional operating devices, as will be presently explained. This plate 6 also provides a bearing 7 for the upper end of a vertically reciprocable spindle 8, alined with the central axis of the machine, and additionally supported in a bearing provided in the bottom of the machine base as best shown in Fig. 2. Reciprocation of said vertical spindle is derived from a transverse driving shaft 9 journaled in radially alined bearings in the base of the machine, and provided with a crank 10 at its inner end directly below said spindle, a suitable connecting rod 11, preferably of the yoked or bi-partite construction shown in Fig. 3, serving to connect such crank to the spindle. Power is applied to the shaft from a driving pulley 12 through suitable reducing gears, as need not be further explained.

Fixedly mounted on the spindle between the upper end of the connecting rod and the bearing in the plate, is a collar provided with an encircling groove or rather a pair of spaced collars 13, leaving such a groove between them, said groove being adapted to receive the inner ends of the longer arms 14 of bell-cranks 15 of substantial construction, one of such bell-cranks being mounted in each of the housings 4, so as to be oscillatory about an axis transverse of a radial line passing through such housings. The inner ends of the bell-crank arms 14 carry anti-friction rollers 16, which contact with the opposed sides of the collars 13, and such ends are free to be moved around in the groove to various positions corresponding with the positions of the respective housings. In the upper portion of each such housing is mounted a reciprocable slide, or plunger 17, the same being connected with the short arm 18 of the bell-crank by a link 19 which is preferably of the adjustable construction shown in Figs. 1 and 2, although it may be simply a plain link, or pair of links 20, as illustrated in Figs. 4 and 5. As shown in the first-named figures, such link comprises two parts 21 and 22 connected by a coupling member 23 formed with right and left handed threads on its respective ends, for engagement with correspondingly threaded openings in said members. Said coupling is provided with apertures 24 in its central portion, to permit of its being rotated by means of a spanner-wrench, whereby the length of the link may be varied to correspondingly vary the limiting positions of the slide 17 in the housing. The inner face of each slide is provided with a socket 25 adapted to receive a punch or die, as will be presently explained.

The upper end of the vertical spindle 8 is enlarged to form a cylindrical head 26 having its lower face 27 beveled, or conical, as shown in Fig. 2; and mounted on the plate 6, so as to have their inner ends in coöperative relation to such head, are a series of plungers or slides 28, corresponding in number and position to the housings 4, said plate being provided with concentric under-cut grooves or T-slots 29, whereby other, smaller housings 30 for supporting such slides 28 in angularly adjusted positions, may be secured to said plate. The inner ends of the slides 28 carry rollers 31 to reduce the friction of the engagement of the spindle therewith, while their outer ends are shaped to conform with the inner face of the tire or rim to be operated upon. Springs 32 serve normally to retract the slides 28 so that they will be actuated outwardly upon the downward movement of the central spindle. The location of the conical face 27 is such that this outward actuation of the slides 28 will occur before the slides 17 in the housings are moved inwardly a sufficient distance to engage the work. Thus where punches 33, or like tools, are mounted in the faces of the outer series of slides, as shown in Figs. 1 and 2, said slides 28 may be advanced into a position to support the rim at the appropriate points before such punches reach an operative stage, and the plunger will have its contacting face formed to permit of the protrusion of the punch through the metal of the rim when necessary.

The general operation of the machine is quite simple and does not require any additional explanation beyond that already given, incidentally to describing the operation of the several parts, it being obvious that rotation of the driving shaft 9 will reciprocate the central spindle 8, and thus operate the several slide-mechanisms connected therewith.

Where it is desired to utilize the machine to simply set or size a tire or rim, the interior set of slides 28, directly actuated by the spindle are omitted, and instead of punches 33 being affixed to the outer series of slides 17, segmental dies 34 are attached thereto, (see Figs. 4 and 5), a sufficient number of housings 4 with their appropriate slides 17 being provided to permit of the entire closure of the circle about the rim when the several dies carried by such slides are forced to the limit of their inward movement. The simultaneous application of the dies all around the rim, which may then be secured, will forcibly contract the latter so that it will conform exactly with the desired circumferential dimension.

It will be obvious that whether it is simply a series of dies that are thus used in the operation of the machine, or a set of punches, in which latter case the interior set of coöperative plungers are in commission, that the tire or rim is operated upon simultaneously around its entire circumference. In the latter case, that is, where punches are used, by providing the proper number of slides, all the various holes, indentations and deformations required on a rim for the various purposes previously explained, may be formed simultaneously by a single downward stroke of the central spindle. The arrangement of the machine is furthermore such as to permit of the easy and expeditious handling of the rims, both in placing them in operative position in the machine, and in removing them from the machine, the plungers or slides being retracted sufficiently to leave ample space for such purpose.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination of a plurality of circularly adjustable, radially movable slides; members carried by said slides, respectively, and adapted to operate on a rim, or the like; and means adapted to simultaneously actuate said slides, said means including a spindle reciprocable axially of the circle on which said slides are adjustable, and bell-cranks adjustable along with said slides and connected to operate the same, respectively, one arm of each such bell-crank engaging said spindle so as to be oscillated upon reciprocation of the latter.

2. In a machine of the character described, the combination of a plurality of circularly adjustable, radially movable slides; members carried by said slides, respectively, and adapted to operate on a rim, or the like; and means adapted to simultaneously actuate said slides, said means including a spindle reciprocable axially of the circle on which said slides are adjustable, and bell-cranks adjustable along with said slides, respectively, one arm of each such bell-crank engaging said spindle so as to be oscillated upon reciprocation of the latter, and a link connecting the other arm of each bell-crank with the corresponding slide.

3. In a machine of the character described, the combination of a plurality of circularly adjustable, radially movable slides; members carried by said slides, respectively, and adapted to operate on a rim, or the like; and means adapted to simultaneously actuate said slides, said means including a spindle reciprocable axially of the circle on which said slides are adjustable, and bell-cranks adjustable along with said slides, respectively, one arm of each such bell-crank engaging said spindle so as to be oscillated upon reciprocation of the latter, and an adjustable link connecting the other arm of each bell-crank with the corresponding slide.

4. In a machine of the character described, the combination of a plurality of circularly adjustable, radially movable slides; members carried by said slides, respectively, and adapted to operate on a rim or the like; and means adapted to simultaneously actuate said slides, said means including a spindle reciprocable axially of the circle on which said slides are adjustable and having a beveled portion adapted to engage said slides to force the same radially outward, and resilient means tending to draw said slides in the opposite direction.

5. In a machine of the character described, the combination of a plurality of circularly adjustable, radially movable slides; members carried by said slides, respectively, and adapted to operate on a rim, or the like; rollers mounted on the inner ends of said slides; and means adapted to simultaneously actuate said slides, said means including a spindle reciprocable axially of the circle on which said slides are adjustable and having a beveled portion adapted to engage said rollers to force said slides radially outward and resilient means tending to retract said slides.

6. In a machine of the character described, the combination of two sets of circularly adjustable, radially movable slides, one set located inside the other with reference to a common center; members carried by the slides of such inner set and adapted to coöperate with the inner face of a rim, or the like, to support the same; tool-members carried by the slides of such outer set and adapted to operate on the outer face of such rim; means adapted to simultaneously move the slides of such inner set outwardly, said means including a spindle reciprocable axially of the circle on which said slides are adjustable and having a beveled portion adapted to engage said slides to force the same radially outward; and other means adapted to simultaneously move the slides of such outer set inwardly, said last-named means including bell-cranks adjustable along with said slides, respectively, one arm of each such bell-crank engaging said spindle so as to be oscillated upon reciprocation of the latter, and a link connecting the other arm of each bell-crank with the corresponding slide.

7. In a machine of the character described, the combination of two sets of circularly adjustable, radially movable slides, one set located inside the other with reference to a common center; members carried by the slides of such inner set and adapted to coöperate with the inner face of a rim, or the like, to support the same; tool-members carried by the slides of such outer set and adapted to operate on the outer face of such rim; means adapted to simultaneously move the slides of such inner set outwardly, said means including a spindle reciprocable axially of the circle on which said slides are adjustable and having a beveled portion adapted to engage said slides to force the same radially outward; and other means adapted to simultaneously move the slides of such outer set inwardly, said last-named means including bell-cranks adjustable along with said slides, respectively, one arm of each such bell-crank engaging said spindle so as to be oscillated upon reciprocation of the latter, and an adjustable link connecting the other arm of each bell-crank with the corresponding slide.

8. In a machine of the character described, the combination of two sets of circularly adjustable, radially movable slides, one set located inside the other with reference to a common center; members carried by the slides of such inner set and adapted to coöperate with the inner face of a rim, or the like, to support the same; tool-members carried by the slides of such outer set and adapted to operate on the outer face of such rim; means adapted to simultaneously move the slides of such inner set outwardly, said means including a spindle reciprocable axially of the circle on which said slides are adjustable and having a beveled portion adapted to engage said slides to force the same radially outward; and other means adapted to simultaneously move the slides of such outer set inwardly, said last-named means including bell-cranks adjustable along with said slides, respectively, one arm of each such bell-crank engaging said spindle so as to be oscillated upon reciprocation of the latter, and a link connecting the other arm of each bell-crank with the corresponding slide, the beveled portion of said spindle being disposed to move such inner set of slides into contact with the rim before said bell-cranks move such outer set of slides into operative position.

Signed by me, this 31st day of October, 1914.

FRANK J. SCHUMANN.

Attested by—
D. T. DAVIES,
C. E. HOGG.